No. 672,656. Patented Apr. 23, 1901.
P. W. TILLINGHAST
BICYCLE SADDLE.
(Application filed Dec. 23, 1896.)
(No Model.)
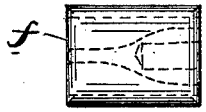
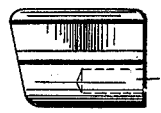
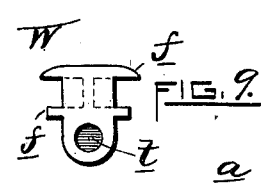
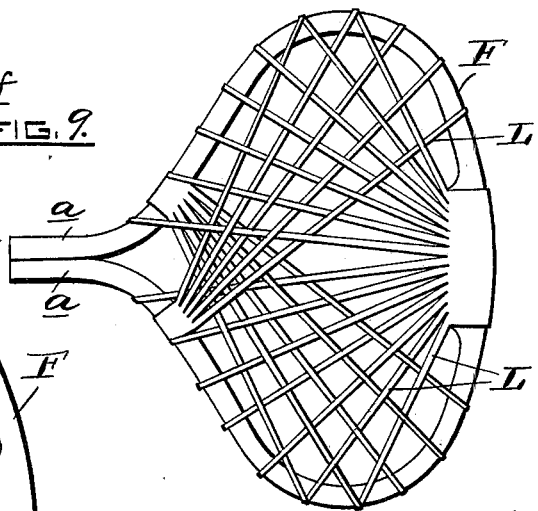
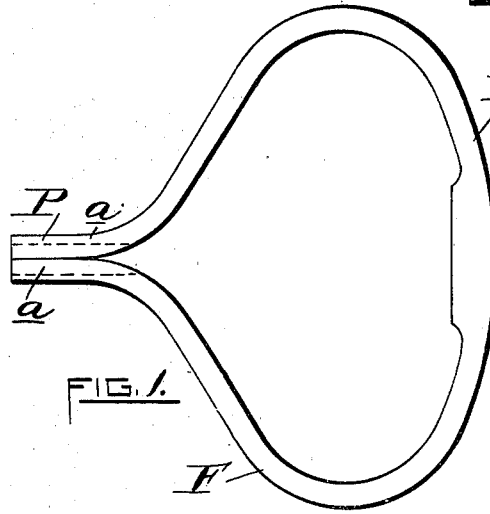
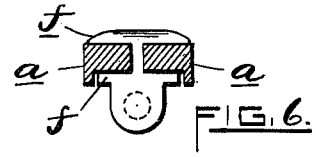
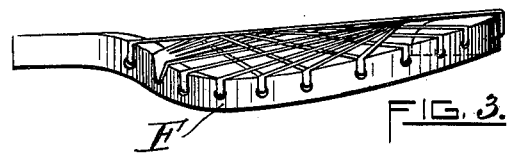
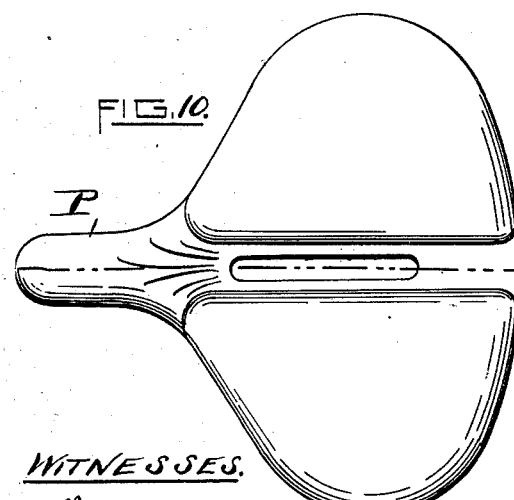
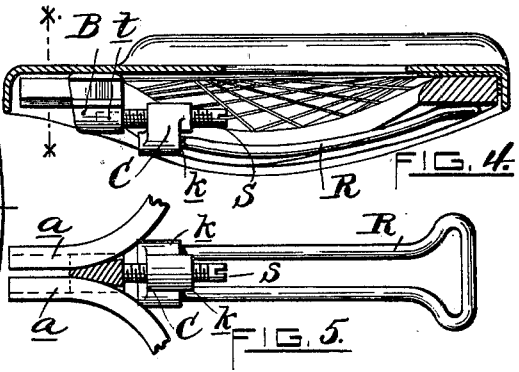
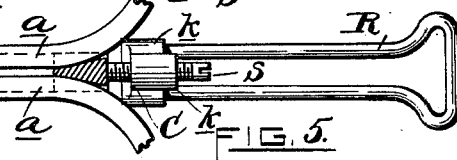
WITNESSES.
Thomas H. Holton.
O. Lapham
INVENTOR.
Pardon W. Tillinghast

UNITED STATES PATENT OFFICE.

PARDON W. TILLINGHAST, OF CRANSTON, RHODE ISLAND.

BICYCLE-SADDLE.

SPECIFICATION forming part of Letters Patent No. 672,656, dated April 23, 1901.

Application filed December 23, 1896. Serial No. 616,725. (No model.)

*To all whom it may concern:*

Be it known that I, PARDON W. TILLINGHAST, of Cranston, in the county of Providence and State of Rhode Island, have invented certain Improvements in Bicycle-Saddles, of which the following is a specification.

The saddles in general use are now made by stretching a heart-shaped leather seat between a cantle, which forms the back of the saddle, and a device at the front or pommel, the cantle affording no support to the sides of the seat.

The object of my invention is to provide a saddle in which the seat is suspended in an open frame and in which the frame is expansible to tighten the seat and adjustable to retain it in its tightened condition.

To that end my invention consists, primarily, in an open adjustably-expansive frame for a bicycle-saddle.

My invention further consists in the combination, with such an open expansible frame, of a seat portion suspended therein and so combined with the frame that the expansion of the frame will serve to tighten the seat.

My invention further consists in the combination, with an open expansible frame, of a seat portion suspended therein and means for expanding the frame to tighten the seat.

My invention further consists in the construction and arrangement of parts hereinafter described and claimed.

In the accompanying drawings, Figure 1 is a plan of the frame. Fig. 2 shows how the lacing may be applied. Fig. 3 is a side view of Fig. 2. Fig. 4 is a section through Fig. 2, showing the nut attached to the supporting-rods and provided with the screw for advancing the wedge. Fig. 5 is a top view of the nut and of the supporting-rods and a section of the wedge, together with the ends of the frame constituting the pommel. Fig. 6 is a section through line X X of Fig. 4. Figs. 7, 8, and 9 are details of the wedge and pommel. Fig. 10 is a top view of the saddle, the seat being provided with cushions and covered with leather or other suitable material.

F is the frame, P the pommel, and L the lacing or strands.

C is the nut, into which the ends of the supporting-rods R are inserted in sockets $k$ and through which the screw S passes and enters a socket $t$ in the wedge-block B. The forward end of the screw-rod, which occupies the socket $t$, is not threaded. The wedge W is shown with an upper and lower flange $f$ to hold the arms $a$ of the pommel from slipping by or overriding each other. I prefer to depress the sides of the frame as they approach the pommel to accommodate the thighs of the rider, the pommel being in substantially the same plane with the rear portions of the frame, and also to make a slight inward curve at the same points for the same purpose.

I have shown a system of lacing by which the strands radiate diagonally across the frame from three points or narrow spaces upon the same, one point being at the rear opposite to the pommel, the other two being opposite to each other at the forward part of the frame near the pommel. If now we locate yielding points in the frame at the rear on either side of the center, the effect of a separation of the arms of the pommel will be to separate the points of attachment of most of the strands and tightens the same, particularly those which radiate from near the pommel. The forward and backward thrust of the screw also increases the distance between the forward and rear parts of the frame, stretching the strands that radiate from the rear to the forward parts of the frame. By this arrangement there are few short strands, and there is the least displacement between their points of attachment, while those strands which are subjected to the most use in riding are operated upon to a greater degree; but I find that by properly proportioning the strength of the strands to the lateral stiffness of the frame good results can be attained also without providing special yielding points. When the expanding force is applied by advancing the screw against the wedge, those parts of the frame connected by strands somewhat slackened will be the first to yield until the slack is taken up, and hence the spreading will take place over such portions of the frame as are least firmly bound together. This will be the practical effect when the strands are arranged as hereinbefore described, and shown in the drawings. As a certain portion of the strands are more exposed to the weight of the rider than others the arrangement of strands can readily be made such that the slack will be taken up in the way last suggested.

What I claim, and desire to secure by Letters Patent, is—

1. A bicycle-saddle consisting of a bent frame with separable ends provided with a seat, and means substantially as described for separating the ends of the frame to tighten the seat.

2. The combination with an open adjustably expansive frame, having free ends, of a seat portion, composed of lacings extending in different directions across the space surrounded by said frame, and means for separating the free ends of the frame, whereby the expansion of the frame by the separation of said free ends will serve to tighten the lacings, substantially as described.

3. A bicycle-saddle consisting of a bent frame with unattached and separable ends, lacings across same for a seat, the frame secured to a support, a nut and adjusting-screw carried by said support, and a wedge engaging with the adjusting-screw, and adapted to separate the ends of the saddle-frame by a forward movement of the adjusting-screw, substantially as set forth.

4. In a bicycle-saddle having a bent frame with unattached and separable ends, a flanged wedge or its equivalent located between the ends of the frame forming the arms of the pommel, the flanges of said wedge extending over and under the arms of the pommel and adapted to prevent an independent vertical movement of the said ends of the frame, and means for forcing the wedge forward to cause a lateral separation of the ends of the frame substantially as described.

5. In a bicycle-saddle the combination of the expansible frame F substantially continuous in outline, the lacings L, the pommel P, consisting of the separable ends of the frame, the support R, the wedge W, and the nut C, provided with the sockets K, and the screw S, all substantially as described.

PARDON W. TILLINGHAST.

Witnesses:
THOMAS H. HOLTON,
O. LAPHAM.